United States Patent
Doucet et al.

(10) Patent No.: US 8,393,620 B2
(45) Date of Patent: Mar. 12, 2013

(54) TRANSPORT DEVICE INCLUDING AN ACTUATING TAPE NIP

(75) Inventors: Louis John Doucet, Salem, NH (US); Glenn Alan Guaraldi, Kingston, NH (US)

(73) Assignee: Goss International Americas, Inc., Durham, NH (US)

( * ) Notice: Subject to any disclaimer, the term of this patent is extended or adjusted under 35 U.S.C. 154(b) by 1652 days.

(21) Appl. No.: 11/498,656

(22) Filed: Aug. 3, 2006

(65) Prior Publication Data
US 2008/0028961 A1    Feb. 7, 2008

(51) Int. Cl.
*B65H 7/02* (2006.01)

(52) U.S. Cl. .............. 271/265.04; 271/273; 271/276; 271/277

(58) Field of Classification Search .......... 271/265.01, 271/265.04, 273, 274, 276, 277
See application file for complete search history.

(56) References Cited

U.S. PATENT DOCUMENTS

| | | | |
|---|---|---|---|
| 4,164,159 A | 8/1979 | Marciniak | 83/280 |
| 4,196,835 A | 4/1980 | Schlough | 227/81 |
| 4,260,145 A | 4/1981 | Mebus et al. | 270/54 |
| 4,482,141 A | 11/1984 | Moser | 270/54 |
| 4,498,663 A | 2/1985 | Wamsley et al. | 270/54 |
| 5,673,910 A * | 10/1997 | Wamsley | 271/259 |
| 6,343,787 B1 | 2/2002 | Kato et al. | |
| 6,616,139 B2 | 9/2003 | Aesch | 271/204 |
| 6,918,729 B2 | 7/2005 | Hobbs | 412/16 |
| 7,040,612 B2 | 5/2006 | Garner et al. | |
| 2005/0225023 A1 | 10/2005 | Schlough | 271/69 |
| 2008/0061499 A1 | 3/2008 | DeGruchy et al. | |

FOREIGN PATENT DOCUMENTS

| | | |
|---|---|---|
| EP | 1 500 617 A2 | 1/2005 |
| JP | 2005-67789 | 3/2005 |
| JP | 2005067789 A * | 3/2005 |

* cited by examiner

*Primary Examiner* — Gerald McClain
(74) *Attorney, Agent, or Firm* — Davidson, Davidson & Kappel, LLC

(57) ABSTRACT

A transport device for transporting printed products is provided including a first and a second tape for receiving and transporting the printed products, a first and second roller for guiding the tapes, a nip-adjusting device adjusting a nip formed by the first and second tapes at the first and second rollers and a sensor determining a thickness of the printed products, the nip adjusting device being actuated as a function of the sensor. A method is also provided.

5 Claims, 4 Drawing Sheets

TRANSPORT DEVICE INCLUDING AN ACTUATING TAPE NIP

BACKGROUND

The present invention relates generally to printing presses and more particularly to a transport device for transporting printed products.

U.S. Pat. No. 4,196,835, hereby incorporated by reference herein, discloses an improved collating machine which includes a stitcher assembly which stitches a group of signatures while they are moving. A saddle conveyor travels past a collating station and individual signatures are fed from the collating station onto the conveyor to form the group of collated signatures. The conveyor carries the group of collated signatures through the stitcher assembly which binds the signatures in each group together.

U.S. Pat. No. 4,482,141, hereby incorporated by reference herein, discloses a method and device for conveying signatures from a blade chain conveyor supporting the signatures directly at a fold line. The signatures are gripped from above by orbitally-rotating clamping pads, which then transfer the signatures to a belt conveyor perpendicular to the blade chain conveyor.

U.S. Pat. No. 6,616,139 discloses a device for removing printed products, having a fold and being transported uniformly spaced and astraddle by a transport device, that has a rotatingly driven gripping device with controlled gripping elements for gripping one of the printed products by the fold on the transport device and removing the printed product while stably holding the printed product.

U.S. Pat. No. 6,918,729 discloses a method and device for trimming a book. A conveying device including an orbital turn unit grips the partially trimmed book, rotates the book 90 degrees and transfers the book to a registration device.

BRIEF SUMMARY OF THE INVENTION

The present invention provides a transport device for transporting printed products including:

a first and a second tape for receiving and transporting the printed products, a first and second roller for guiding the tapes, a nip-adjusting device adjusting a nip formed by the first and second tapes at the first and second rollers, and a sensor determining a thickness of the printed products, the nip adjusting device being actuated as a function of the sensor.

The present invention also provides a method for transporting printed products including the steps of:

setting a nip to a first size for printed products having a first thickness, sensing a printed product having a second thickness different from the first thickness, the printed product sensing occurring prior to the printed product entering the nip, adjusting the first size of the nip, to a second size different from the first size, to receive the printed product having a second thickness, and transporting the printed product having the second thickness through the nip.

BRIEF DESCRIPTION OF THE DRAWINGS

A preferred embodiment of the present invention will be elucidated with reference to the drawings, in which.

DETAILED DESCRIPTION OF A PREFERRED EMBODIMENT

Figure 1:
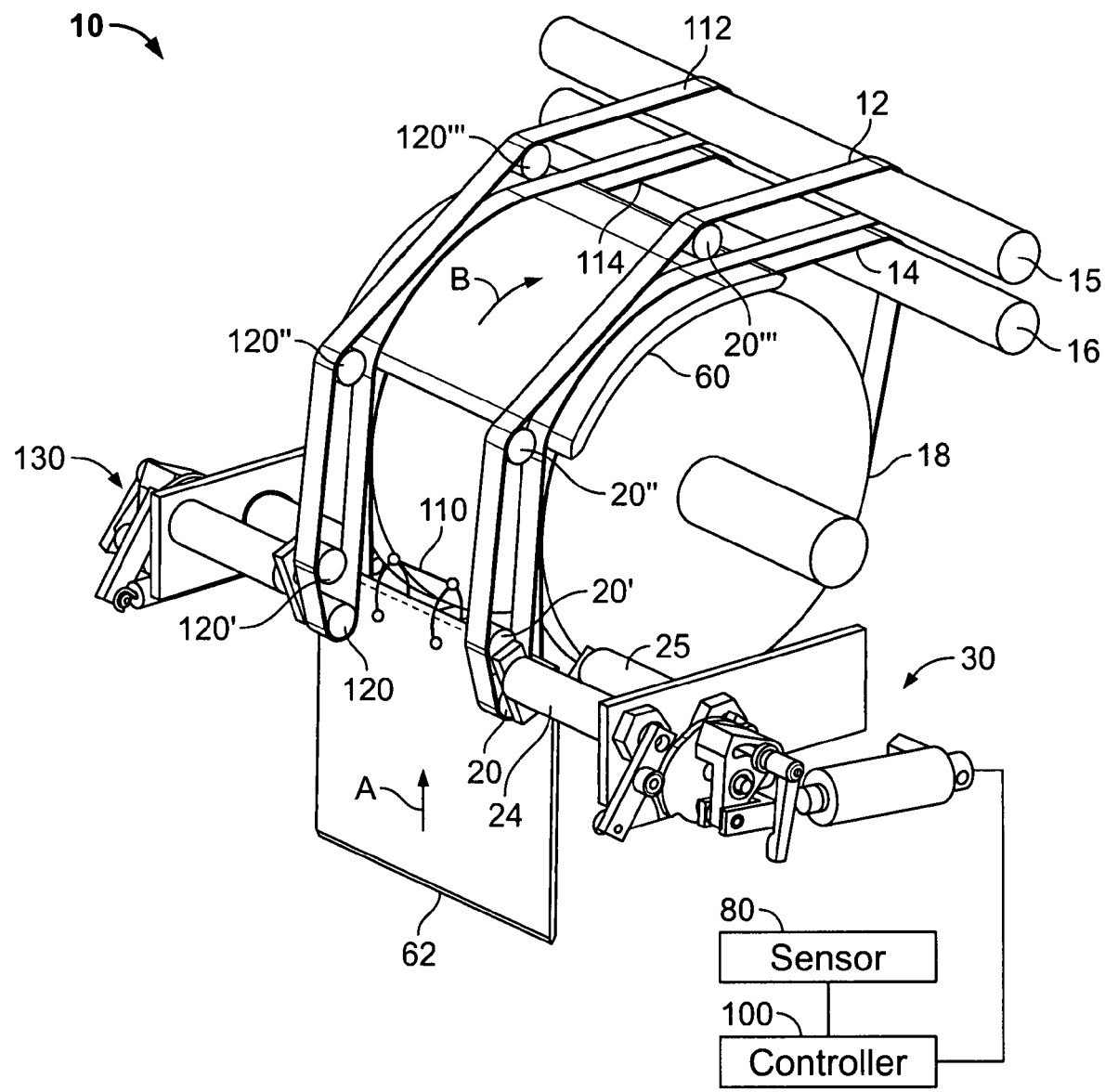
FIG. 1 shows a transport device according to the present invention.

FIG. 1 shows a preferred embodiment of a transport device 10 including transport tapes 12, 14, 112, 114, wheel 18 and nip-adjusting devices 30, 130. The transport device 10 adjusts to transport printed products, such as books, of varying thicknesses. A nip 70 (FIG. 2) is initially set to transport books 60 with a predetermined thickness. Grippers 110, which may be grippers similar to those disclosed in U.S. Pat. No. 4,482,141, grip and carry books 60, 62 to transport device 10 via nip 70. When a different thickness book 62 is detected by a sensor 80, a controller 100 adjusts the size of nip 70 to accommodate incoming book 62, as shown in FIG. 3. Once book 62 is transported, the nip 70 may return back to the initial size before receiving the next book.

Figure 2:
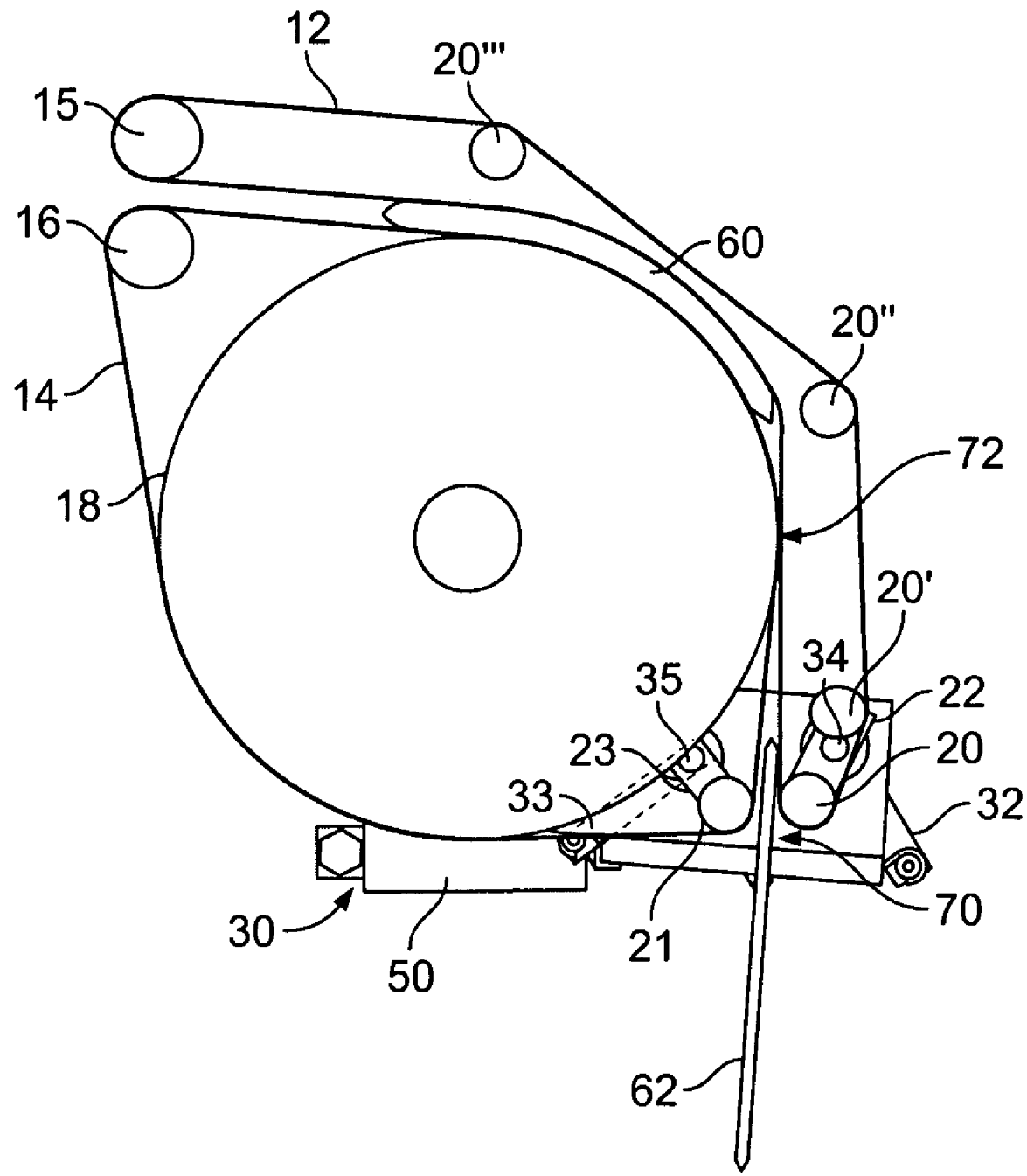
FIG. 2 shows a cross section of the transport device.
Figure 3:
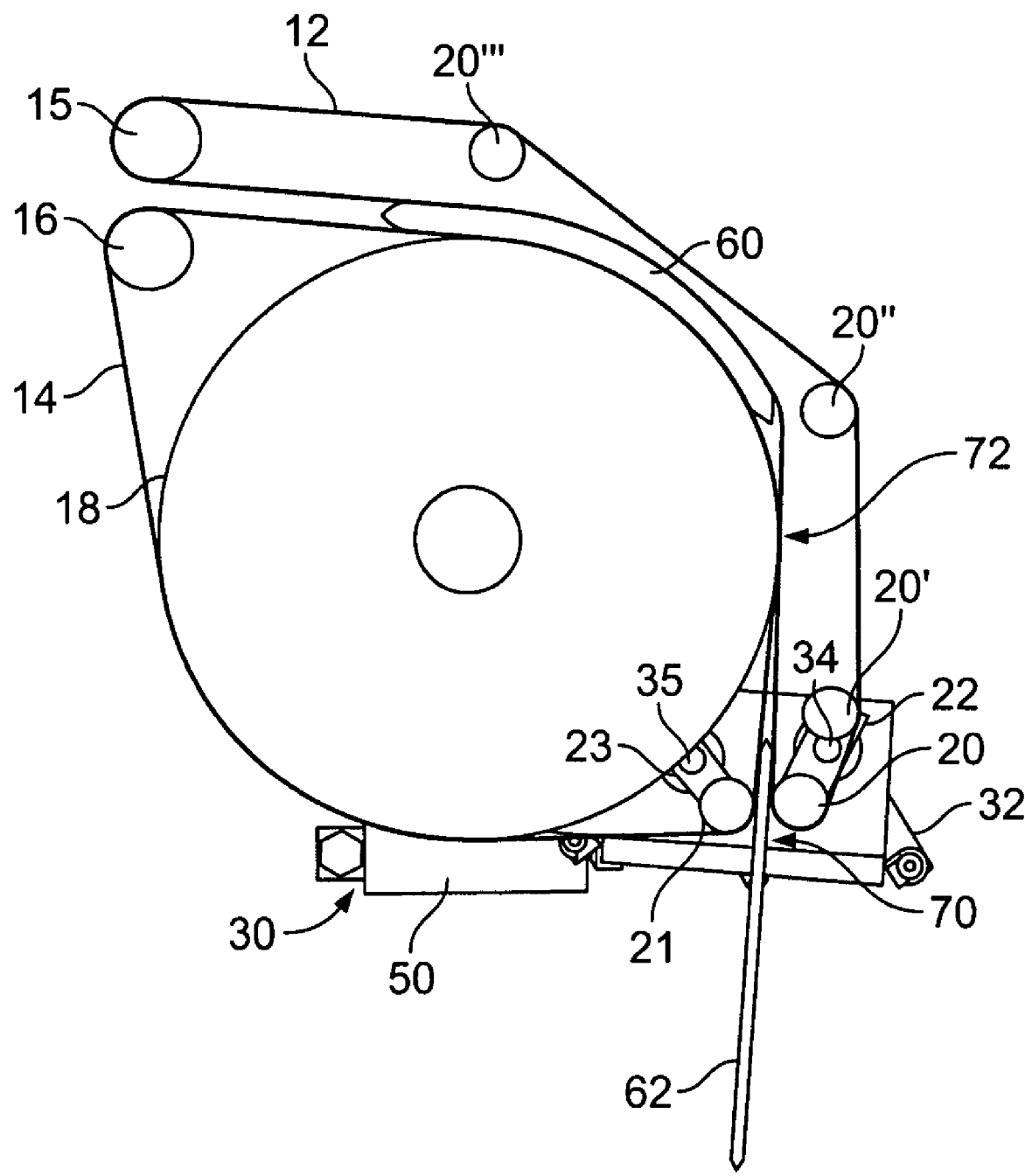
FIG. 3 shows another cross section of the transport device.

As shown in FIG. 2, a nip 70 is formed between rollers 20, 21 and transport tapes 12, 14. Transport tape 12 travels around tape rollers 20, 20', 20", 20'" and idle roller 15. Transport tape 14 travels around roller 21, wheel 18 and idle roller 16. Nip-adjusting device 30 is set initially so transport tapes 12, 14 receive books 60 with a predetermined thickness and transport books 60 around wheel 18.

Nip-adjusting device 30 connects to tape rollers 20, 21 via roller arms 22, 23, shafts 34, 35 and housings 24, 25. Tape rollers 20, 21 are mounted to roller arms 22, 23 which are fixed to shafts 34, 35. Shafts are supported by housings 24, 25 shown in FIG. 1. Attached to an opposite end of shafts 34, 35 are levers 32, 33 shown in FIG. 4.

As shown in FIGS. 2 and 3, nip 70, in an initial size in FIG. 2, is adjusted to accommodate a thinner book 62. In FIG. 3, the horizontal distance between tape rollers 20 and 21 is decreased so the size of nip 70 is smaller. Nip-adjusting device 30 controls the movement of tape rollers 20 and 21 to vary the size of nip 70. Thus, for example, when an incomplete book 62 occurs, the transport tapes 12, 14 can properly transport the incomplete book. Without the automatic adjustment, jamming or dropping of incomplete book 62 may occur.

Figure 4:
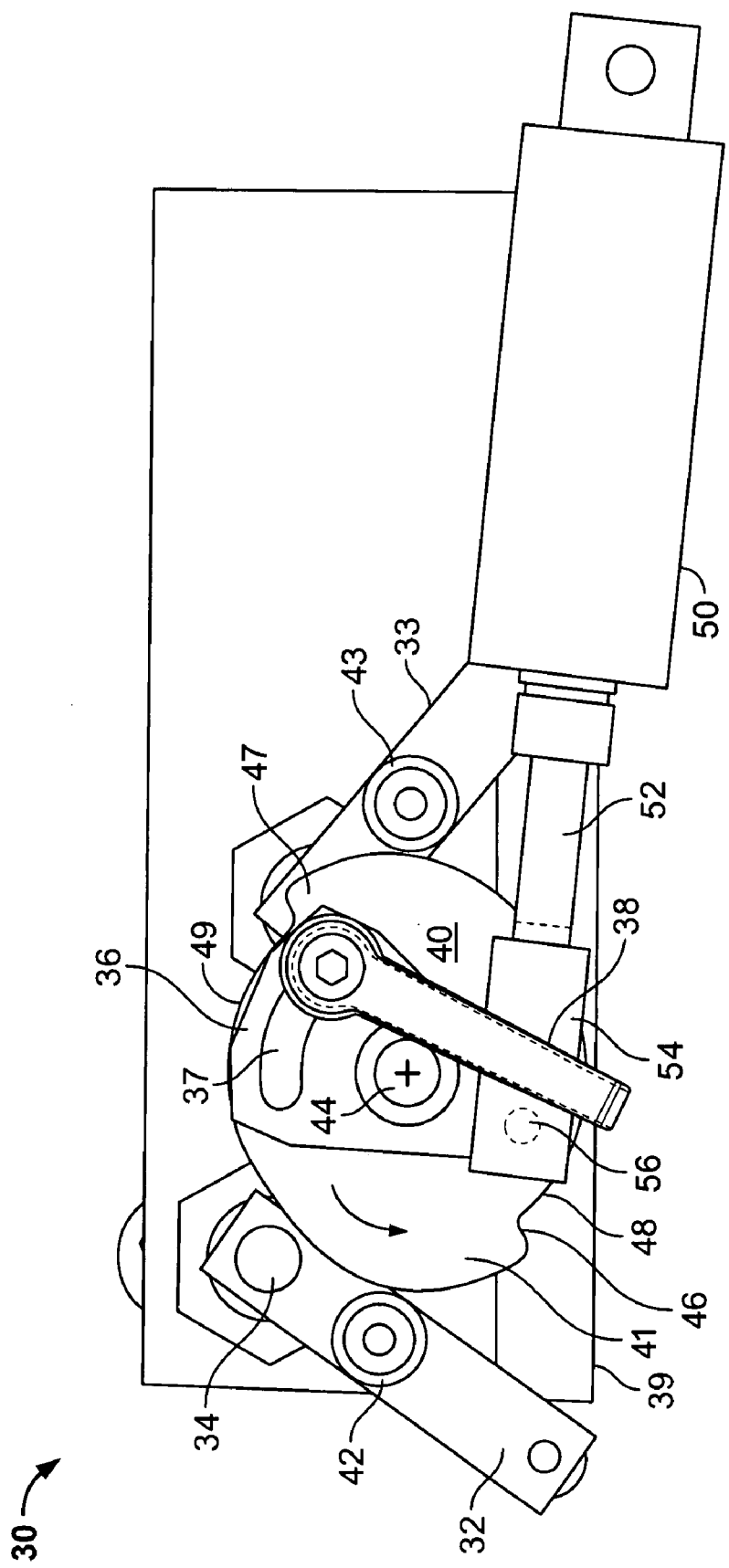
FIG. 4 shows a view of nip-adjusting device of the transport device.

As shown in FIG. 4, nip-adjusting device 30 includes levers 32, 33 with cam followers 42, 43. Levers 32, 33 are spring loaded toward a cam 40 via a spring connector 39. Cam 40 includes a cam surface 41 having a geometry providing high dwells 46, 47 and low dwells 48, 49. An adjustable handle 38 secures a lever 36 to cam 40. Lever 36 and cam 40 both rotate around axis 44. Handle 38 may be adjusted in slot 37 to change the rotation of cam 40, setting the initial size of nip 70 as desired.

Nip-adjusting device 30 also includes prong 54, shaft 52 and pneumatic cylinder 50. Prong 54 is fixed to lever 36 by pin 56. When controller 100 actuates nip-adjusting device 30, pneumatic cylinder 50 causes shaft 52 to retract or extend, rotating lever 36. This movement of lever 36 rotates cam 40 about axis 44 in the counterclockwise or clockwise direction, respectively.

As shown in FIGS. 1 to 4, nip 70 is set initially to receive a book 60, already being conveyed by transport tapes 12, 14, 112, 114 in a direction B. A sensor 80 detects a thin book 62 and relays message to controller 100. Controller 100 activates nip-adjusting devices 30, 130. Pneumatic cylinder 50 retracts shaft 52. As shaft 52 is retracted lever 36 rotates in the counterclockwise direction via pin 56 and prong 54. Cam followers 42, 43 approach low dwells 48, 49 of cam 40. Subsequently, levers 32, 33 pivot towards one another which cause roller arms 22, 23 to move towards one another via shafts 34, 35. The movement of roller arms 22, 23 towards each other shortens the horizontal distance between tape rollers 20 and 21 thereby reducing the size of nip 70. Thus, nip 70 closes in on book 62 so transport tapes 12, 14, 112, 114 contact and transport thin book 62 in a direction A.

The transport device may include two separate nip-adjusting devices to transfer unbalanced books that are thicker on one end. Nip-adjusting device 30 can be actuated independently of nip-adjusting device 130 to adjust for unbalanced thickness at one end with respect to the other end.

Preferably, the timing of the actuating devices is such that the nip closes on the book and not before the book. This reduces or eliminates the impact from transferring an incomplete thick book into a closed nip.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarding in an illustrative manner rather a restrictive sense.

What is claimed is:

1. A transport device for transporting printed products comprising:
   a first and a second tape for receiving and transporting the printed products;
   a first and second roller for guiding the tapes;
   a nip-adjusting device adjusting a nip formed by the first and second tapes at the first and second rollers;
   a sensor determining a thickness of the printed products, the nip adjusting device being actuated as a function of the sensor; and
   a further nip-adjusting device independently actuatable with respect to the nip-adjusting device.

2. The transport device as recited in claim 1 wherein the first and second rollers are connected to a first and second cam follower via a first and second shaft.

3. The transport device as recited in claim 1 wherein the nip-adjusting device includes a cam.

4. The transport device as recited in claim 1 wherein the nip-adjusting device includes a pneumatic cylinder.

5. The transport device as recited in claim 1 further comprising a controller.

* * * * *